US006785089B2

United States Patent
Bernett et al.

(10) Patent No.: US 6,785,089 B2
(45) Date of Patent: Aug. 31, 2004

(54) DISC DRIVE GAS SUPPLY SYSTEM

(75) Inventors: Frank William Bernett, Longmont, CO (US); Kurt Michael Anderson, Louisville, CO (US); Walter Wong, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 158 days.

(21) Appl. No.: 10/071,119

(22) Filed: Feb. 7, 2002

(65) Prior Publication Data

US 2003/0090832 A1 May 15, 2003

Related U.S. Application Data

(60) Provisional application No. 60/339,365, filed on Nov. 13, 2001.

(51) Int. Cl.[7] .............................................. G11B 17/02
(52) U.S. Cl. ..................................... 360/97.02; 360/69
(58) Field of Search ............................. 360/69, 97.02, 360/97.03, 97.01

(56) References Cited

U.S. PATENT DOCUMENTS

| | | | |
|---|---|---|---|
| 2,274,781 A | 3/1942 | Ensminger | 62/1 |
| 3,882,473 A | 5/1975 | Hoehmann | 360/98 |
| 4,367,503 A | 1/1983 | Treseder | 360/98 |
| 4,396,964 A | 8/1983 | Morehouse et al. | 360/98 |
| 4,488,192 A | 12/1984 | Treseder | 360/98 |
| 4,556,969 A | 12/1985 | Treseder et al. | 369/291 |
| 4,684,510 A | 8/1987 | Harkins | 423/210 |
| 5,454,157 A | 10/1995 | Ananth et al. | 29/603 |
| 6,075,204 A | 6/2000 | Celauro et al. | 174/17 GF |
| 6,144,178 A * | 11/2000 | Hirano et al. | 318/476 |
| 6,178,755 B1 | 1/2001 | Castellanet | 62/50.1 |
| 6,317,286 B1 * | 11/2001 | Murphy et al. | 360/97.02 |
| 6,560,064 B1 * | 5/2003 | Hirano | 360/97.02 |

\* cited by examiner

*Primary Examiner*—Robert S. Tupper
(74) *Attorney, Agent, or Firm*—Merchant & Gould P.C.

(57) ABSTRACT

A disc drive gas supply system for supplying a gas other than air to an enclosed environment containing a disc includes a source of gas other than air, which can be connected to the enclosed environment. A pressure sensor produces a pressure signal, such as an electrical, pneumatic, or mechanical signal, that is representative of the pressure within the enclosed environment. A control module receives the pressure signal and connects the source of gas other than air to the enclosed environment if the pressure within the enclosed environment is within a predetermined pressure range. When the pressure within the enclosed environment is above the predetermined pressure range, the control module disconnects the source of gas other than air from the enclosed environment. A disc drive shipping and storage package includes a disc drive defining an internal enclosed environment containing a gas other than air. The package also includes a sealed storage container containing the disc drive and defining an external enclosed environment that also contains the gas other than air.

17 Claims, 7 Drawing Sheets

DISC DRIVE GAS SUPPLY SYSTEM

RELATED APPLICATIONS

This application claims priority of U.S. provisional application Serial No. 60/339,365, filed Nov. 13, 2001.

FIELD OF THE INVENTION

This application relates generally to disc drives and more particularly to a system for supplying a disc drive with a gas other than air.

BACKGROUND OF THE INVENTION

A disc drive typically includes a base to which various components of the disc drive are mounted. A top cover cooperates with the base to form a housing that defines an internal clean environment for the disc drive. Sealing and filling the clean environment of disc drives with gases other than air can enhance their performance. For example, low-density inert gases such as helium can reduce the aerodynamic drag between the discs and their associated read/write heads by a factor of approximately five-to-one compared to operating in air. This reduced drag results in reduced power requirements for the spindle motor. A helium filled drive thus uses substantially less power than a comparable disc drive that operates in an air environment.

Despite the advantages of helium filled drives, such drives have not been commercially successful. This is mainly due to problems associated with the helium leaking from the disc drives over time. As the helium leaks out, air leaks in causing undesirable effects in the operation of the disc drives and possibly causing the disc drives to fail. For example, the increased concentration of air may increase the forces on the read/write head due to turbulent airflow within a drive and it may cause noise and/or the heads to fly at too great a distance above the discs.

Accordingly, there is a need for an improved system that can effectively supply a disc drive with a gas other than air, such as helium, during use. The present invention provides a solution to this and other problems, and offers other advantages over the prior art.

SUMMARY OF THE INVENTION

Against this backdrop the present invention has been developed. An embodiment of the present invention is a disc drive gas supply system for supplying a gas other than air to an enclosed environment containing a data storage device such as a data storage disc. The system includes a source of gas other than air, such as a pressurized tank, which can be connected to the enclosed environment. A pressure sensor connected to the enclosed environment produces a pressure signal, such as an electrical, pneumatic, or mechanical signal, that is representative of the pressure within the enclosed environment. A control module receives the pressure signal and connects the source of gas other than air to the enclosed environment if the pressure within the enclosed environment is within a predetermined pressure range. When the pressure within the enclosed environment is above the predetermined pressure range, the control module disconnects or isolates the source of gas other than air from the enclosed environment. The predetermined pressure range is preferably above ambient pressure to prevent air from leaking into the enclosed environment.

The system can be utilized with a second enclosed environment that contains a second disc. In that case, the source of gas other than air is also selectively connectable to the second enclosed environment. Alternatively, the enclosed environment may enclose a plurality of separate disc drives each defining an internal environment. The enclosed environment and the internal environments of the disc drives can contain the gas other than air to further prevent air from entering the internal environments of the disc drives.

Another embodiment of the present invention includes a disc drive shipping and storage package. The package includes a disc drive defining an internal enclosed environment containing a gas other than air. The package also includes a sealed storage container containing the disc drive and defining an external enclosed environment that also contains the gas other than air to prevent air from leaking into the internal enclosed environment of the disc drive.

These and various other features as well as advantages which characterize the present invention will be apparent from a reading of the following detailed description and a review of the associated drawings.

DETAILED DESCRIPTION

Figure 1:
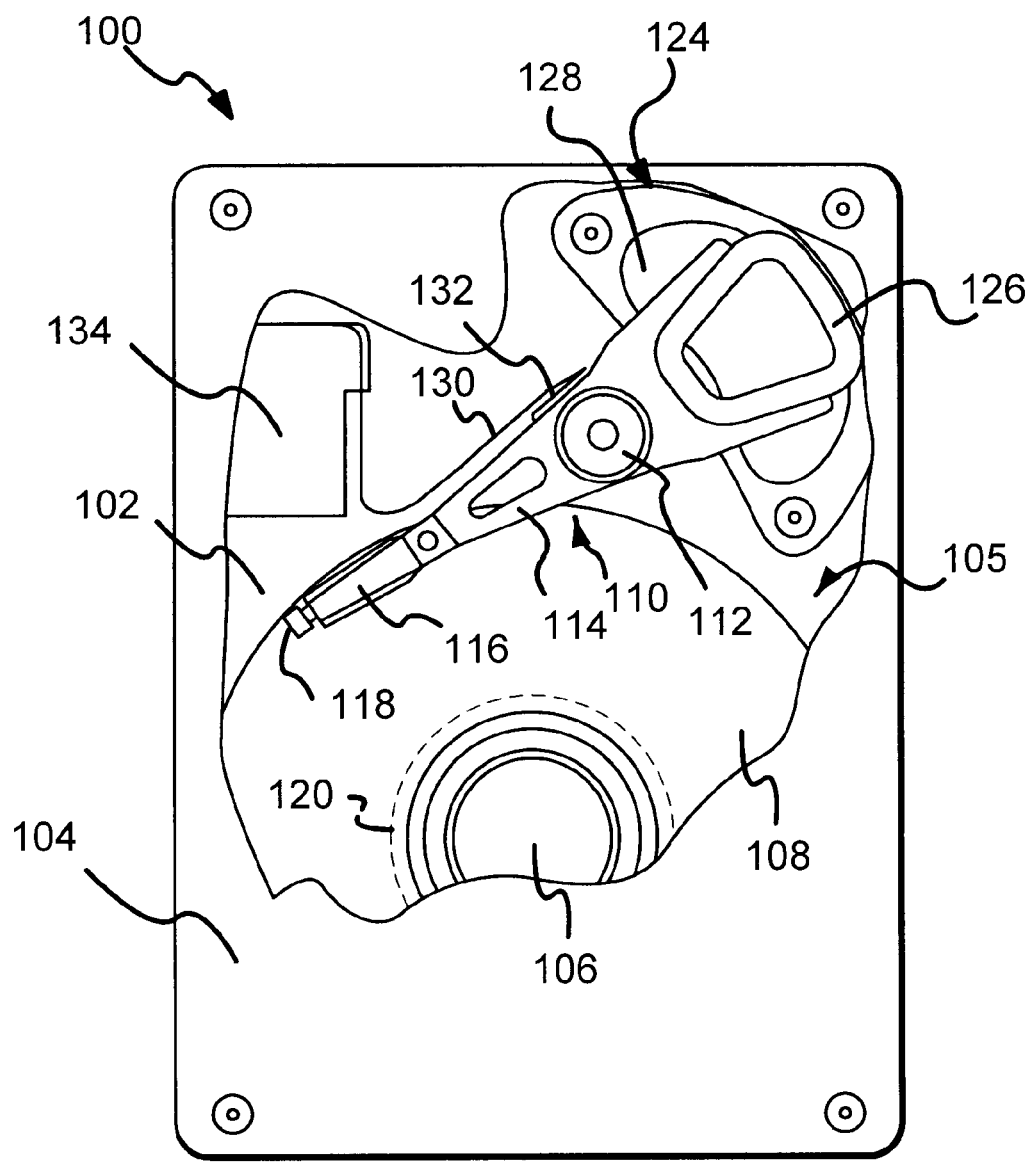
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing that defines an enclosed sealed environment or internal environment 105 for the disc drive in a conventional manner. The enclosed environment 105 of the disc drive 100 is filled with helium to enhance the performance of the disc drive 100.

The components of the disc drive 100 include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114, which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
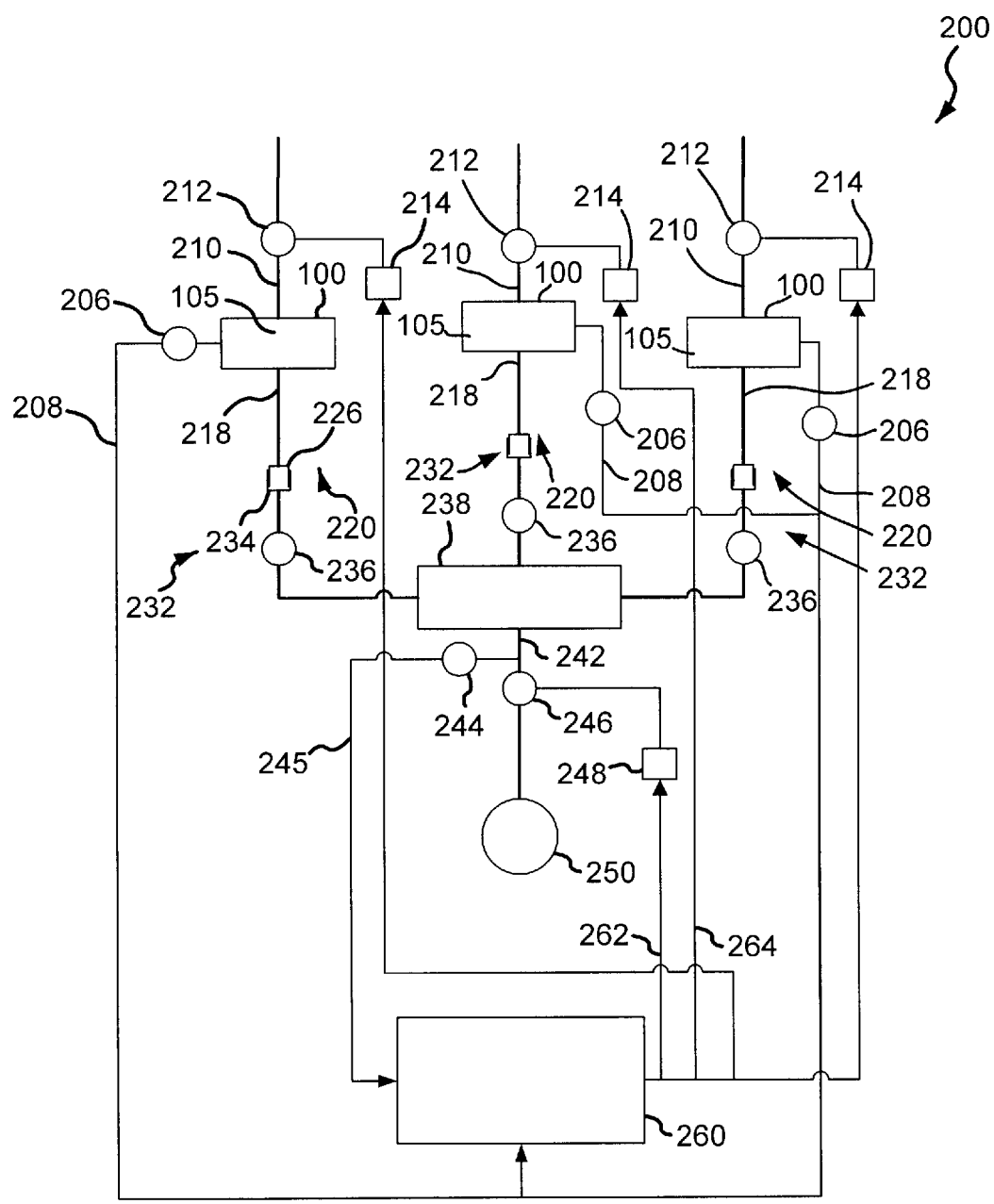
FIG. 2 is a schematic diagram of a disc drive gas supply system in accordance with a preferred embodiment of the present invention.

Referring now to FIG. 2, a supply system 200 for supplying gas other than air to plural disc drives such as the disc drive 100 will be described. Preferably, the system includes a concentration sensor 206 for producing a concentration signal 208 that is representative of the concentration of the gas other than air within the enclosed environment 105 of the disc drive 100.

A disc drive exit line 210 extends from each disc drive 100 to an external environment. A disc drive exit valve 212 is normally closed to prevent gases from exiting through the disc drive exit line 210. An actuator 214 opens and closes the disc drive exit valve 212. In a preferred embodiment, the disc drive exit valve 212 is a bimetallic strip and the actuator 214 includes a coil. When a current is passed through the coil, the coil heats the bimetallic strip, causing it to deform. Thus, the normally closed bimetallic strip valve 212 will deform to open when a current is passed through the coil in the actuator 214.

The system 200 also includes a disc drive entry line 218 extending from each disc drive 100. The entry line extends through a disc drive connection apparatus 220. The disc drive connection apparatus 220 includes a hole or aperture 224 extending through a wall of the base 102 of the disc drive 100. A disc drive fitting or needle 226 is mounted to the base 102 and extends away from the disc drive 100. Thus, gas is able to flow into the disc drive 100 through the needle 226 and the hole 224.

Figure 3:
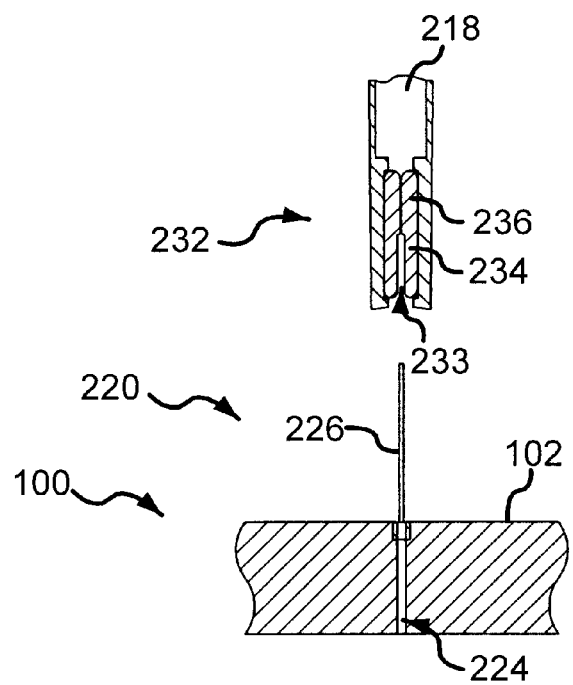
FIG. 3 is a sectional view of a disc drive connection apparatus and a supply system connection apparatus that are disconnected according to an embodiment of the present invention.
Figure 4:
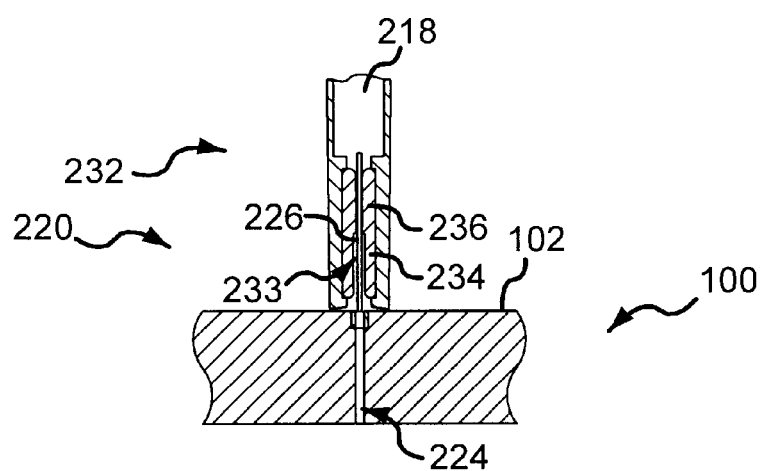
FIG. 4 is a sectional view of the disc drive connection apparatus and the supply system connection apparatus of FIG. 3 after being connected.

A supply connection apparatus 232 includes a supply fitting 234 and a supply connection valve 236 that is normally closed. Preferably, when the needle 226 engages the supply fitting 234 the needle automatically opens the supply connection valve 236. In a preferred embodiment, the fitting 234 and the valve 236 are a single diaphragm 232 that is composed of an elastic material, such as an elastomeric material. The diaphragm has a normally closed hole or aperture 233 therethrough. The diaphragm 232 is preferably similar to the types of female fittings commonly used in sports balls, such as basketballs. As shown in FIG. 3, the diaphragm 232 is normally closed. However, when the needle 226 is inserted into the hole 233, the needle 226 forces the hole 233 of the diaphragm 232 open as shown in FIG. 4 and the opening of the needle 226 is inserted past the diaphragm 232. The a disc drive 100 can easily be connected to the supply system 200 by inserting the needle 226 of the disc drive 100 into the hole 233. Thus, when the disc drive connection apparatus 220 and the supply connection apparatus 232 are mated, gas is able to flow through the disc drive entry line 218 and into the enclosed environment 105 of the disc drive 100.

Referring back to FIG. 2, each disc drive entry line 218 extends from the supply connection apparatus 232 to a manifold 238. A main supply line 242 supplies gas to the manifold 238 and thus to the disc drives 100 through the disc drive entry lines 218. A pressure sensor 244 produces a pressure signal 245 that represents the pressure within the main supply line 242. The main supply line 242 extends to a supply valve 246 that is opened and closed by a supply valve actuator 248. The supply valve 246 is connected to a source of gas other than air 250. Preferably, the source of gas other than air is a pressurized tank containing the gas other than air, such as helium.

A control module 260 receives the concentration signals 208 and the pressure signal 245. The control module 260 produces a supply valve actuator signal 262 that prompts the supply valve actuator 248 to open and close the supply valve 246. Preferably, the control module 260 prompts the supply valve actuator 248 to open the supply valve 246 when the pressure signal 245 indicates that the pressure within the main supply line 242 is within a predetermined pressure range that is preferably above ambient pressure. In a preferred embodiment, the pressure range is between about 760 and about 1000 torr. When the supply valve 246 is opened, gas flows into the main supply line 242 from the source of gas other than air 250, thereby increasing the pressure within the main supply line. The control module 260 preferably prompts the supply valve actuator actuator 248 to close the supply valve 246 when the pressure signal 245 indicates that the pressure within the main supply line is above the predetermined pressure range.

When the pressure within the enclosed environment 105 of a disc drive 100 drops below the pressure within the main supply line 242, air flows from the main supply line 242, through the disc drive entry line 218, and into the enclosed environment 105 of the disc drive 100. Thus, the pressure within the enclosed environment 105 each disc drive 100 is substantially the same as the pressure within the main supply line 242.

The pressure sensor 244, the supply valve 246 and the supply valve actuator 248 can all be part of a pressure regulator. Of course, in such an embodiment the pressure signal 245 can be an electrical signal or it can be a pneumatic or mechanical signal within the pressure regulator, and at least a portion of the control module 260 can reside within the pressure regulator. The pressure regulator can be specifically designed to keep the pressure of the main supply line 242 within the predetermined pressure range or it can be manually or remotely adjustable.

Also, rather than having a single supply valve 246, the system alternatively can have a supply valve on each of the disc drive entry lines 218. In this embodiment of the present invention, a pressure sensor preferably senses the pressure within each of the disc drive entry lines 218, rather than sensing only the overall pressure within the main supply line 242. In this embodiment, the pressure can be individually regulated for each disc drive 100. Also, in this embodiment the control module 260 can monitor the amount of gas being used by each disc drive 100. Thus, if one of the disc drives 100 is unduly leaking, the control module 260 can set a warning flag to warn a user and inform the user of the leaking disc drive 100.

Because the enclosed environment 105 of each disc drive 100 is maintained above ambient pressure little if any air will actually leak into the enclosed environments 105. However, some air may enter the enclosed environments 105 by diffusion. Over time, such air may be significant enough to affect the performance of the disc drives 100. Thus, when the concentration of the gas other than air within an enclosed environment 105 of a disc drive 100 drops too low, the enclosed environment 105 is preferably flushed with the gas other than air for a predetermined period of time. More specifically, when the concentration signal 208 from one of the disc drives 100 indicates that the concentration is low, the control module 260 produces an exit valve actuator signal 264 that prompts the corresponding disc drive exit valve actuator 214 to open the disc drive exit valve 212 allowing gas to flow from the enclosed environment 105 through the disc drive exit line 210. As the gas flows from the enclosed environment 105, the pressure within the enclosed environment 105 will drop. As the pressure drops, gas will flow into the enclosed environment 105 from the disc drive entry line 218. The gas will continue to flow from the disc drive entry line 218 into the enclosed environment 105 and out of the enclosed environment 105 through the disc drive exit line 210, thereby flushing air from the enclosed environment 105.

Figure 5:
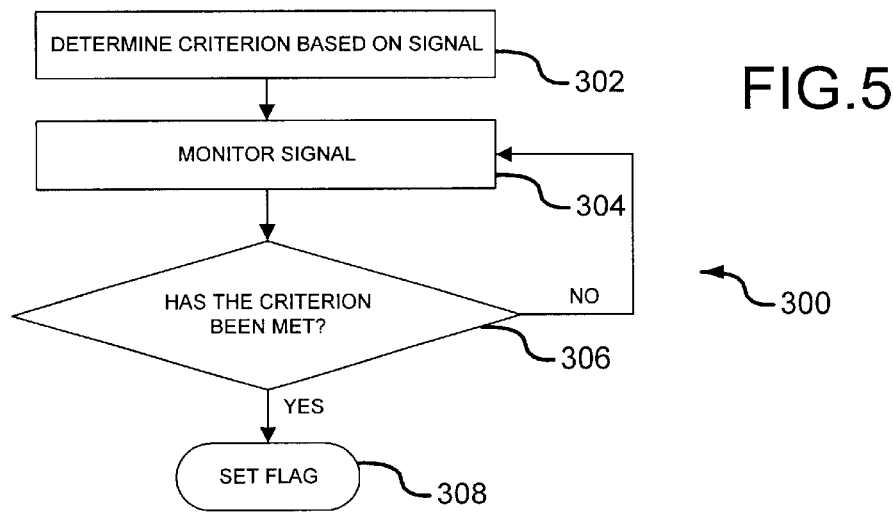
FIG. 5 is an operation flow diagram of a general leak detection method in accordance with a preferred embodiment of the present invention.

Referring now to FIG. 5, a method 300 of detecting that the concentration of helium in a disc drive 100 is in danger of falling to an unacceptable level will be described. Of course, this same method can be used to detect low concentrations of other non-air gases. In operation 302 a criterion is determined based on a signal. Preferably the signal represents a characteristic that will vary as the concentration of a gas in the disc drive 100 varies. The criterion based on that signal indicates that the concentration of the gas in the disc drive 100 is in danger of falling to an unacceptable level, and the criterion preferably indicates that the concentration will fall below an unacceptable level within a predetermined period of time.

In operation 304 the signal is monitored to determine in query operation 306 whether the criterion has been met. If the criterion has not been met, monitoring of the signal continues in operation 304. If the criterion has been met, indicating that the concentration of helium in the disc drive 100 will fall below an unacceptable level within a predetermined period of time then a flag is set in operation 308. Preferably, the flag prompts the control module 260 to flush the particular disc drive 100 as described above to assure that the concentration of helium within the disc drive 100 is maintained at an acceptable level.

Figure 6:
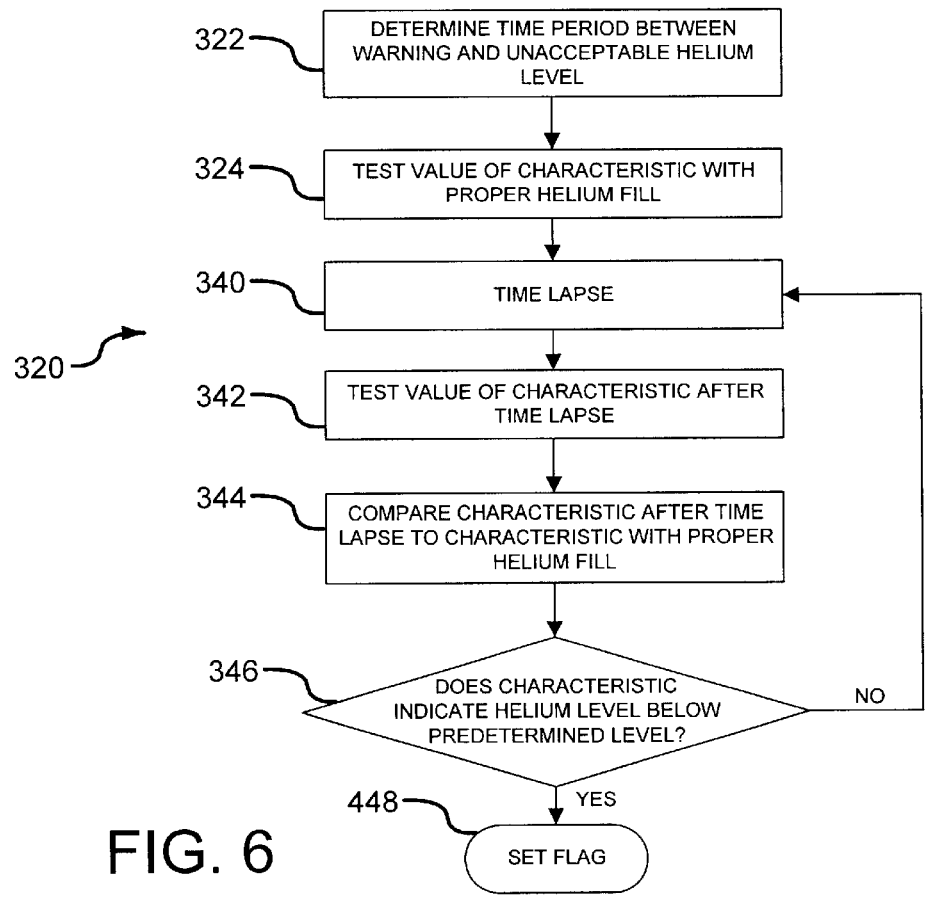
FIG. 6 is an operation flow diagram of a specific preferred embodiment of the method of FIG. 5.

Referring now to FIG. 6, a method 320 is a more detailed embodiment of the method 300 described above. In operation 322, a period of time is determined between the flag that will be set and the time when the concentration of helium in the disc drive 100 will reach an unacceptable level. This period of time should be chosen so that the supply system 200 has adequate time to properly flush the disc drive 100 to bring the concentration of helium in the disc drive to an acceptable level.

In operation 324, the value of a characteristic is tested while the disc drive 100 is properly filled with an acceptable concentration of helium. An acceptable concentration of helium should be determined for a particular disc drive 100. Preferably, this is done by determining the number of read and/or write errors that occur in the disc drive 100 at particular levels of helium fill. As an example, an acceptable concentration of helium fill in a disc drive 100 might be 95% of helium in the disc drive 100 (i.e., 95% of the gas in the disc drive is helium). Thus, when the concentration of helium is at or above 95% the drive will operate properly and the number of read and/or write errors will be acceptable, but when the concentration of helium is below 95% the drive will have an unacceptable number of read and/or write errors. The number of acceptable read and/or write errors will vary depending on the drive and particularly the features of the drive that may compensate for read and/or write errors. However, techniques for determining acceptable numbers of read and/or write errors is known to those skilled in the art.

The characteristic may be any of a number of characteristics that indicate the concentration of helium in the disc drive 100. For example, the characteristic might be the fly height of the head over the disc 108 (i.e., the distance between the head 118 and the corresponding disc surface during operation of the disc drive 100). The fly height will increase as more air leaks into the disc drive 100 and the concentration of the helium in the disc drive 100 decreases accordingly. As the fly height increases, the amplitude of the read signals produced by the head 118 will decrease. Thus, a drop in amplitude of the read signals indicates that the concentration of helium in the disc drive has also dropped. The read/write transducer of the head 118 acts as a concentration sensor 206 of the fly height characteristic by producing the read signals. Read signals can be monitored using an existing processor in the disc drive that incorporates existing monitoring techniques.

Figure 7:
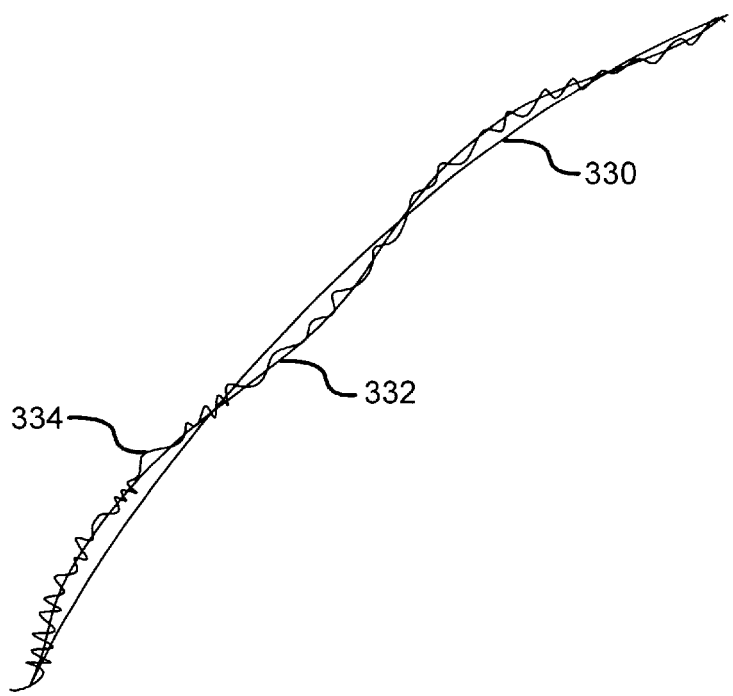
FIG. 7 is a plan view of an ideal track path, a track path including only repeatable runout, and a track path including repeatable and nonrepeatable runout.

Another example of a characteristic that will vary with the concentration of the helium in the disc drive 100 is nonrepeatable runout. FIG. 7 illustrates what is meant by nonrepeatable runout. A portion of an ideal circular track path is shown as 330. Referring to FIGS. 1 and 7, the track path 332 shows the path that a head 118 would follow if only repeatable runout were present. The path 332 does not follow exactly along the ideal circular path 330 because of tolerances in the disc stack on the spindle motor 106 such that the spindle motor 106 does not rotate the disc 108 in a perfectly circular path. However, the path 332 is repeatable in that the displacement from center is the same for each angle of disc rotation and the head will follow along that path when the head later attempts to track the ideal path 330. Thus, if only repeatable runout were present, the head 118 would follow essentially the same path 332 when writing information to the disc 108 and when reading information from the disc 108.

Realistically, however, the head actually follows a path 334 while attempting to track the ideal path 330 due to nonrepeatable runout. Because of nonrepeatable runout, the path 334 strays from the repeatable runout path 332. Thus, the nonrepeatable runout may be quantified as the variation of the actual path 334 of the head 118 from the repeatable runout path 332. A position error signal produced by the read/write transducer of the head 118 indicates the distance between the actual head path 334 and the ideal track path 330. This position error signal may be used to quantify the nonrepeatable runout by factoring out the repeatable runout according to known techniques. The sensors and processors for monitoring the nonrepeatable runout position error signal are already common on disc drives and are known to those skilled in the art.

Figure 8:
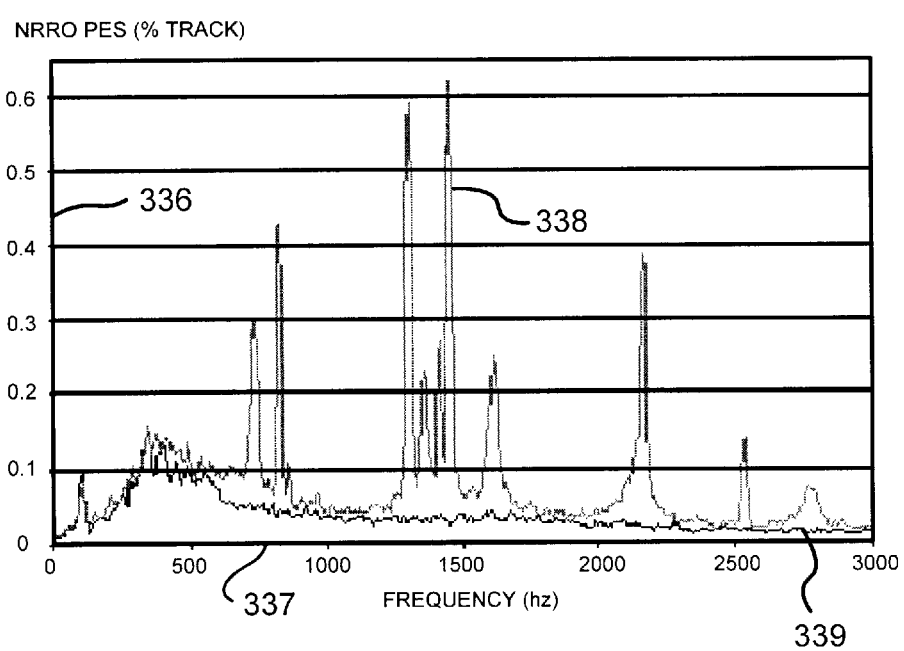
FIG. 8 is a chart comparing the nonrepeatable runout position error signal of a disc drive with a helium environment and a disc drive with an air environment.

FIG. 8 illustrates the difference in the nonrepeatable runout position error signal between a disc drive 100 filled with helium and a disc drive filled with air. The vertical axis 336 represents the percent of the track variation, or the percent of the track width that the head 118 has strayed due to nonrepeatable runout. Thus, if the track variation were 100%, the head 118 would have strayed by a full track width due to nonrepeatable runout. The horizontal axis 337 represents frequencies in the position error signal. Line 338 represents the position error signal in an air environment. The line 339 represents the position error signal in a helium environment. As can be seen, at several different frequencies the position error signal 338 in the air environment is drastically higher than the position error signal 339 in the helium environment. It is believed that these high magnitudes are due to vibrations in components in the disc drive 100 such as the discs 108 themselves and that the amplitudes of these vibrations are considerably less in a helium environment because of decreased turbulent airflows.

Accordingly, the nonrepeatable runout position error signal is considerably less over the same track in a helium environment than in an air environment. This is an advantage for helium filled disc drives. Besides demonstrating the usefulness of the helium filled disc drive 100, this change in the nonrepeatable runout position error signal can be used to indicate the concentration of helium in a particular disc drive 100. Thus, an increase in the value of the nonrepeatable runout position error signal indicates a corresponding decrease in the concentration of helium in the disc drive 100.

While the nonrepeatable runout position error signals and read signals are the most preferred signals to be monitored, several other characteristics and representative signals could also be used so long as they indicate the concentration of helium in the disc drive 100. For example, the drag on the discs 108 as they rotate is another characteristic that would indicate the concentration of helium in the disc drive 100. The representative signal of this characteristic could be the run current of the spindle motor 106. As the concentration of helium in the disc drive 100 decreases, the drag on the discs 108 increases, thereby requiring a greater run current to the spindle motor 106.

Referring back to FIG. 6, after a time lapse at operation 340 the value of the characteristic is tested in operation 342. The time lapse is preferably short enough to prevent significant drops in the helium concentration between testing intervals in operation 342, but long enough that the tests in operation 342 are not overly burdensome to the system. For example, the time lapse could be twenty-four hours. This testing preferably includes running the head 118 over the same track that was used to obtain the test value in operation 324 (i.e., a test track). It may be desirable to run the head 118 over several test tracks to assure an accurate assessment of the characteristic and the indicated helium concentration. This testing includes monitoring the signal that is representative of the characteristic, as described above.

In operation 344 the value of the characteristic obtained in operation 342 after the time lapse in operation 340 is compared to the value of the characteristic obtained in operation 324 with proper helium fill. In query operation 346 it is determined whether the characteristic indicates a helium concentration below a predetermined warning level. This warning level is the criterion described above that preferably indicates the concentration of helium will reach the unacceptable level within the predetermined time period. The value of the characteristic or representative signal that corresponds to the predetermined warning level can be determined by first determining a helium concentration that should prompt the system to warn the user. This determination can be performed by using a tested or estimated helium leak rate for the particular drive and determining the amount of helium fill that will allow for that leak rate during the predetermined period of time before reaching the unacceptable helium concentration level.

If the tested value of the characteristic indicates that the helium concentration is at or below the determined warning level, then a flag is set at operation 348. As described above in method 300, the flag preferably prompts the system 200 to flush the particular disc drive 100. If the value of the characteristic indicates that the helium concentration is above the predetermined warning level then a time lapse will be allowed in operation 340. After the time lapse, the method 320 will proceed to operation 342. The operations 340, 342, 344 and 346 will be repeated until the helium concentration falls to the predetermined warning level.

Figure 9:
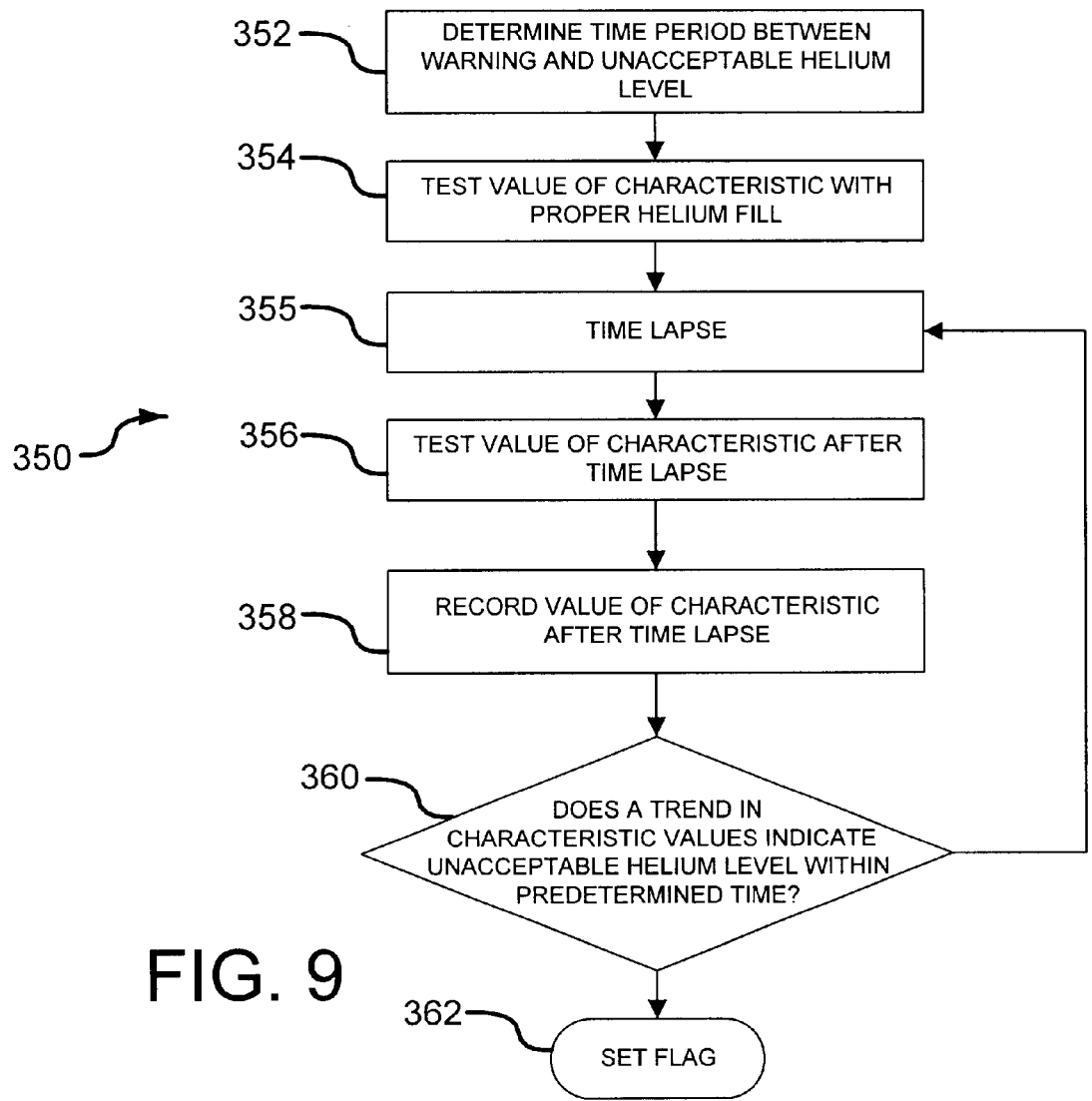
FIG. 9 is an operation flow diagram of a specific alternative embodiment of the method of FIG. 5.

Referring now to FIG. 9, a specific alternative embodiment of the general method 300 will be described. In the method 350 a time period and an unacceptable concentration of helium are determined in operation 352 as in operation 322 of method 320 shown in FIG. 6. As in operation 324 of method 320, a test value of the characteristic determinative of the concentration of helium in the disc drive 100 is tested with a proper fill of helium in operation 354. As with method 320, the characteristic may be any characteristic that will indicate the concentration of helium in the disc drive 100.

After a time lapse in operation 355, a value of the characteristic is tested in operation 356 as in operation 342 of method 320. In operation 358, a value of the characteristic after the time lapse is recorded. This may be done by simply recording the value of the representative signal. As an example, the value may be recorded on a designated area of a disc 108 of the disc drive 100. In query operation 360 it is determined whether a trend in characteristic values indicates an unacceptable helium concentration will be reached within the predetermined period of time. In this embodiment, this trend is the criterion that preferably indicates an unacceptable level of helium will be reached within the predetermined period of time. For example, query operation 360 may determine the rate of change of the characteristic based on prior recorded characteristic values and use that rate along with the last recorded value of the characteristic to determine whether the characteristic will reach a value indicating an unacceptable concentration of helium in the disc drive 100 in the predetermined period of time. If such a trend is present, then a flag is set in operation 362 as described above. If the trend does not indicate that an unacceptable concentration of helium will be reached within the predetermined period of time, then the method 350 returns to operation 355 and a time lapse occurs. Operations 355, 356, 358 and 360 are repeated until a trend indicates that an unacceptable concentration of helium will be reached within the predetermined period of time.

Method 320 may be preferred because it is simpler than the method 350. However, the method 350 may in some applications be preferred because it accounts for varying leakage rates of helium from the particular disc drive 100.

The concentration signal 208 may be produced during each sensing operation or it may be produced only after a flag is set as described above.

Figure 10:
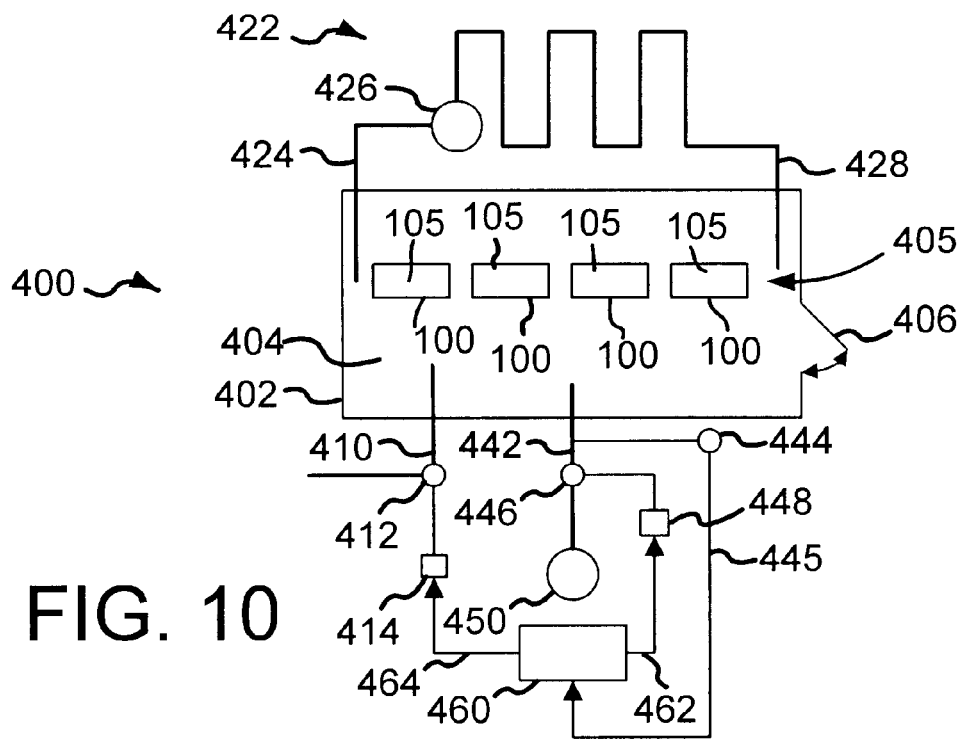
FIG. 10 is a schematic diagram of an alternative disc drive gas supply system in accordance with an alternative embodiment of the present invention.

Referring now to FIG. 10, an alternative helium supply system 400 includes an enclosure 402 that defines an enclosed environment 404. The enclosure 402 is preferably made of a metal, such as aluminum although it can be some other type of material that will prevent undue leakage. The enclosed environment 404 contains an array 405 of disc drives 100 that each define an internal environment 105. The enclosure 402 includes a door 406 that can be opened for inserting or removing equipment, such as disc drives 100, from the enclosed environment 404. The door 406 can also be closed and preferably sealed to prevent undue leakage.

A supply system exit line 410 preferably extends from the enclosure 402 to an external environment. A supply system exit valve 412 is generally closed to stop the gas other than air from leaking from the enclosed environment 404. A supply system exit valve actuator 414 opens and closes the supply system exit valve 412. The supply system exit valve 412 and the supply system exit valve actuator 414 together are preferably a solenoid valve combination such as the solenoid valve combination 246, 248 described above.

A heat exchanger 422 communicates away heat produced within the enclosed environment 404, such as heat produced by the disc drives 100. In an embodiment of the present invention, the heat exchanger includes an intake line 424 that extends to a pump 426 outside the enclosed environment 404. An exit line 428 extends from the pump and back into the enclosed environment 404. Thus, the pump 426 draws gas and associated heat from the enclosed environment 404 and circulates the gas so that heat is communicated away from it. The cooled gas is then recirculated back into the enclosed environment 404. Other heat exchanger configurations could be used so long as they communicate heat away from the enclosed environment 404.

A supply system entry line 442 extends from the enclosed environment 404 and a pressure sensor 444 produces a pressure signal 445 that represents the pressure within the supply system entry line 442 and thus the pressure within the enclosed environment 404. The supply system entry line 442 extends to a supply valve 446 that is opened and closed by a supply valve actuator 448. The supply valve 446 is connected to a source of gas other than air 450. In an embodiment of the present invention, the source of gas other than air 450 is a pressurized helium tank.

A control module 460 receives the pressure signal 445 and produces a supply valve actuator signal 462 that prompts the supply valve actuator 448 to open and close the supply valve 446. Preferably, the control module 460 prompts the supply valve actuator 448 to open the supply valve 446 when the pressure signal 445 indicates that the pressure within the enclosed environment 404 is within a predetermined pressure range that is preferably above ambient pressure. In a preferred embodiment, the pressure range is between about 760 and about 1000 torr. When the supply valve 446 is opened, gas flows into the supply system entry line 442 from the source of gas other than air 450, thereby increasing the pressure within the supply system entry line 442 and the enclosed environment 404. The control module 460 preferably prompts the supply valve actuator 448 to close the supply valve 446 when the pressure signal 445 indicates that the pressure within the supply system entry line 442 is above the predetermined pressure range.

Because the enclosed environment 404 is kept at a pressure above ambient, very little air will leak into the enclosed environment 404. The internal environments 105 of the particular disc drives 100 are preferably kept at the same pressure as the enclosed environment 404, but they may be at a lower or higher pressure.

The control module 460 also produces an exit valve actuator signal 464 that prompts the exit valve actuator 414 to open and close the exit valve 412. When the exit valve 412 is open, the supply system 400 will flush the enclosed environment 404 in a manner similar to the supply system 200 flushing the enclosed environment 105 of a disc drive 100 described above. This will likely be done after a user has opened the door 406, such as to replace a disc drive 100.

The various fluid lines of the supply systems 200 and 400 can be made of standard materials, such as metals or polymers. In a preferred embodiment, the lines are comprised of stainless steel.

The pressure sensor 444, the supply valve 446 and the supply valve actuator 448 can all be part of a pressure regulator. Of course, in such an embodiment the pressure signal 445 can be an electrical signal or it can be a pneumatic or mechanical signal within the pressure regulator and a portion of the control module 460 can reside within the pressure regulator. The pressure regulator can be designed specifically to keep the pressure of the supply system entry line 442 within the predetermined pressure range or it can be manually or remotely adjustable.

Because the supply system 400 surrounds each internal enclosed environment 105 with the gas other than air, very little air will enter the internal enclosed environments by leakage or diffusion. However, the disc drives 100 will still have to be replaced occasionally. New disc drives 100 should be filled with helium before placing them in the enclosed environment 404. In a preferred embodiment, the disc drives 100 are filled with helium before being shipped to the site of the enclosure 402.

Figure 11:
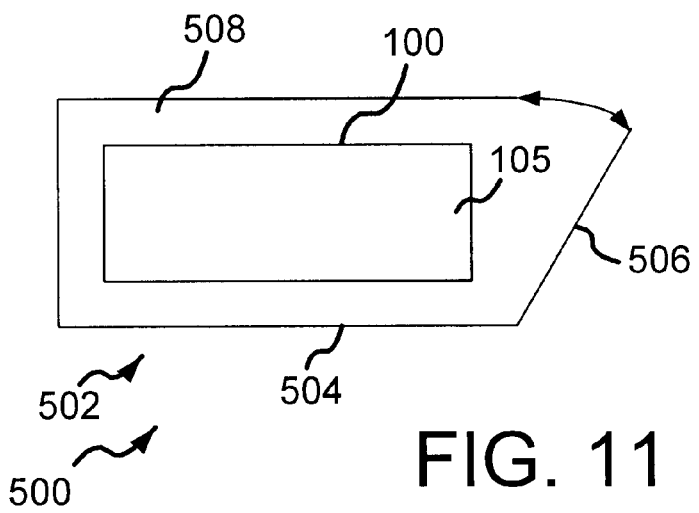
FIG. 11 is a schematic diagram of a disc drive shipping or storage package according to the present invention.

Referring to FIG. 11, in an embodiment of the present invention the disc drives 100 are shipped and/or stored within a shipping package 500 to prevent significant leakage of helium from the enclosed environments 105 of the disc drives 100. The shipping package 500 includes a container 502 that contains a disc drive 100. The container 502 includes a body 504 and a door or lid 506 that spans an aperture in the body 504 to seal the container 502. The container 502 thus defines an external enclosed environment 508. The external enclosed environment 508 is also filled with the gas other than air. As with the enclosed environment 404 described above, the external enclosed environment 508 will prevent significant leakage or diffusion of air into the internal enclosed environment 105 of the disc drive 100. The body 504 and the lid 506 are preferably composed of a metal such as aluminum and they are preferably sealingly joined together by welding, brazing or soldering. If the body 504 and the lid 506 are welded together, for example, the lid 506 or the body 504 can include a thinned portion that will readily allow a user to create an opening to remove the disc drive 100 from the container 502.

Alternatively described, embodiments of the present invention include a disc drive gas supply system (such as 200 or 400) for supplying a gas other than air to a first enclosed environment (such as 105 or 404) containing a disc (such as 108). The system includes a source of gas other than air (such as 250 or 450) that is selectively connectable to the first enclosed environment. A pressure sensor (such as 244 or 444) is connected to the first enclosed environment and is able to produce a pressure signal (such as 245 or 445) representative of a pressure within the first enclosed environment. A control module (such as 260 or 460) receives the pressure signal and connects the source of gas other than air to the first enclosed environment if the pressure within the first enclosed environment is within a predetermined pressure range. The control module disconnects the source of gas other than air from the first enclosed environment if the pressure within the first enclosed environment is above the predetermined pressure range.

The predetermined pressure range is preferably above ambient atmospheric pressure. In an embodiment of the present invention, the first enclosed environment (such as 404) encloses a plurality of separate disc drives each defining an internal environment (such as 105). The first enclosed environment and the internal environments each contain the gas other than air. The system may also include a heat exchanger (such as 422) connected to the enclosed environment for transferring heat away from the first enclosed environment.

In another embodiment a second enclosed environment (such as 105) contains a second disc (such as 108). In that case, the source of gas other than air is selectively connectable to the second enclosed environment. The pressure signal can be representative of a pressure within the first aforesaid enclosed environment and the second enclosed environment. The control module receives the pressure signal and connects the source of gas other than air to the first and second enclosed environments if the pressure within the first and second enclosed environments is within the predetermined pressure range. The control module disconnects the source of gas other than air from the first and second enclosed environments if the pressure within the first and second enclosed environments is above the predetermined pressure range.

The system can further include a first fitting apparatus between the first enclosed environment and the source of gas other than air. The first fitting apparatus includes a first elastic diaphragm (such as 232) defining a first normally closed aperture (such as 233) therethrough engagable with a first needle (such as 226) for sealingly extending through the first aperture. Likewise, a second fitting apparatus between the second enclosed environment and the source of gas other than air includes a second elastic diaphragm (such as 232) defining a second normally closed aperture (such as 233) engagable with a second needle (such as 226) for sealingly extending through the second aperture. In one embodiment of the present invention, the first needle is mounted on a first disc drive (such as 100) that defines the first enclosed environment and the second needle is mounted on a second disc drive (such as 100) that defines the second enclosed environment. The elastic diaphragm is preferably comprised of an elastomeric material.

The system can further include an exit valve (such as 212) separating the first enclosed environment from an exit environment having a pressure below the predetermined pressure range. The control module can be operable to open and close the exit valve. The system can also include a concentration sensor (such as 206) connected to the first environment. The concentration sensor is able to produce a concentration signal (such as 208) responsive to variations in the concentration of the gas other than air in the first enclosed environment and a processor receiving the concentration signal and setting a flag if a predetermined criterion has been met. The control module opens the exit valve after the flag has been set. The control module preferably closes the valve a predetermined period of time after opening the valve. The gas other than air is preferably helium.

Another an embodiment of the present invention may be described as a disc drive shipping and storage package (such as 500). The package includes a disc drive (such as 100) defining an internal enclosed environment (such as 105) containing a gas other than air and a sealed storage container (such as 502) containing the disc drive and defining an external enclosed environment (such as 508) that contains the gas other than air. The container is preferably made of metal, and it preferably includes a body (such as 504) having an opening and a lid (such as 506) spanning the opening. The lid is preferably welded, brazed, soldered or otherwise sealed to the body.

An embodiment of the present invention may also be described as a disc drive gas supply system (such as 200 or 400) for supplying a gas other than air to an enclosed environment (such as 105 or 404) containing a disc (such as 108). The system includes a source of gas other than air (such as 250 or 450). The system also includes means for supplying the gas other than air from the source of gas other than air to the enclosed environment and maintaining a pressure of the enclosed environment above a predetermined pressure.

The enclosed environment may contain a plurality of disc drives (such as 100). Also, the means for supplying can also include means for supplying the gas other than air to a second enclosed environment (such as 105).

It will be clear that the present invention is well adapted to attain the ends and advantages mentioned as well as those inherent therein. While embodiments have been described for purposes of this disclosure, various changes and modifications may be made which are well within the scope of the present invention. For example, disc drives filled with air could be included in the same arrays as the disc drives filled with gas other than air described above. Numerous other changes may be made which will readily suggest themselves to those skilled in the art and which are encompassed in the scope of the invention disclosed and as defined in the appended claims.

What is claimed is:

1. A disc drive gas supply system for supplying a gas other than air to a first enclosed environment containing a first disc, the system comprising:

a source of gas other than air selectively connectable to the first enclosed environment;

a pressure sensor connected to the first enclosed environment, the sensor being operable to produce a pressure signal representative of a pressure within the first enclosed environment; and a control module receiving the pressure signal and operably connecting the source of gas other than air to the first enclosed environment if the pressure within the first enclosed environment is within a predetermined pressure range above ambient atmospheric pressure and disconnecting the source of gas other than air from the first enclosed environment if the pressure within the first enclosed environment is above the predetermined pressure range.

2. The system of claim 1, wherein the first enclosed environment encloses a plurality of separate disc drives each defining an internal environment, and wherein the first enclosed environment and the internal environments each contain the gas other than air.

3. The system of claim 2, further comprising a heat exchanger connected to the first enclosed environment for transferring heat away from the first enclosed environment.

4. The system of claim 1, further comprising a second enclosed environment containing a second disc, wherein the source of gas other than air is selectively connectable to the second enclosed environment.

5. The system of claim 4, wherein:
the pressure within the first enclosed environment is approximately equal to a pressure within the second enclosed environment; and
the control module receives the pressure signal and operably connects the source of gas other than air to the first and second enclosed environments if the pressure within the first and second enclosed environments is within the predetermined pressure range and disconnects the source of gas other than air from the first and second enclosed environments if the pressure within the first and second enclosed environments is above the predetermined pressure range.

6. The system of claim 4, further comprising:
a first fitting between the first enclosed environment and the source of gas other than air, the first fitting comprising a first elastic diaphragm defining a first normally closed aperture therethrough engagable with a first needle for sealingly extending through the first aperture; and
a second fitting between the second enclosed environment and the source of gas other than air, the second fitting comprising a second elastic diaphragm defining a second normally closed aperture therethrough and a second needle for sealingly extending through the second aperture.

7. The system of claim 6, wherein:
the first needle is mounted on a first disc drive that defines the first enclosed environment; and
the second needle is mounted on a second disc drive that defines the second enclosed environment.

8. The system of claim 6, wherein the elastic diaphragm is comprised of an elastomeric material.

9. The system of claim 1, further including an exit valve separating the first enclosed environment from an exit environment having a pressure below the predetermined pressure range.

10. The system of claim 9, wherein the control module is operable to open and close the exit valve.

11. The system of claim 10, further comprising:
a concentration sensor connected to the first environment, the concentration sensor being operable to produce a signal responsive to variations in the concentration of the gas other than air in the first enclosed environment; and
a processor receiving the signal and setting a flag if a predetermined criterion has been met;
wherein the control module opens the exit valve after the flag has been set.

12. The system of claim 11, wherein the control module closes the valve a predetermined period of time after opening the valve.

13. The system of claim 1, wherein the gas other than air is helium.

14. A disc drive gas supply system for supplying a gas other than air to an enclosed environment containing a disc, the system comprising:
a source of gas other than air; and
means for supplying the gas other than air from the source of gas other than air to the enclosed environment and maintaining a pressure within the enclosed environment above a predetermined pressure.

15. The system of claim 14, wherein the enclosed environment contains a plurality of separate disc drives.

16. The system of claim 14, further comprising a second enclosed environment containing a second disc drive, wherein the means for supplying and maintaining further comprises means for supplying the gas other than air to the second enclosed environment.

17. The system of claim 14, wherein the means for supplying and maintaining comprises:
a pressure sensor connected to the enclosed environment, the pressure sensor being operable to produce a pressure signal representative of the pressure within the enclosed environment;
a control module receiving the pressure signal and connecting the source of gas other than air to the enclosed environment if the pressure within the enclosed environment is within a predetermined pressure range and disconnecting the source of gas other than air from the enclosed environment if the pressure within the enclosed environment is above the predetermined pressure range.

* * * * *